US006950740B1

(12) United States Patent
Cook

(10) Patent No.: US 6,950,740 B1
(45) Date of Patent: Sep. 27, 2005

(54) SYSTEM AND METHOD OF FUEL MAP SELECTION

(75) Inventor: Anthony J. Cook, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/924,518

(22) Filed: Aug. 24, 2004

(51) Int. Cl.[7] .............................................. G06F 17/00
(52) U.S. Cl. ....................... 701/104; 701/211; 701/213
(58) Field of Search ............................... 701/104, 102, 701/115, 29, 200, 202, 211, 213; 455/456.6

(56) References Cited

U.S. PATENT DOCUMENTS 5,619,412 A 4/1997 Hapka
5,760,742 A * 6/1998 Branch et al. ........... 455/456.6
6,078,850 A * 6/2000 Kane et al. ................... 701/29
6,292,724 B1 9/2001 Apsell et al.
6,651,001 B2 11/2003 Apsell
6,654,684 B2 * 11/2003 Shinada et al. ............. 701/211
6,686,880 B1 2/2004 Marko et al.
6,725,151 B2 * 4/2004 Itou ........................... 701/123

FOREIGN PATENT DOCUMENTS

JP 10-26005 A * 9/1998 .......... G01C 21/00

* cited by examiner

*Primary Examiner*—Hieu T. Vo
(74) *Attorney, Agent, or Firm*—Jeffrey P. Calfa; Dennis Kelly Sullivan; Susan L. Lukasik

(57) ABSTRACT

A centralized control system linked to vehicles by wireless two way communication utilizes position information reported by the vehicles to select a fuel injection limiting map for use by the vehicles and downloads the selection, or authorization to use a map already stored on the vehicle.

3 Claims, 3 Drawing Sheets

SYSTEM AND METHOD OF FUEL MAP SELECTION

BACKGROUND OF THE INVENTION

1. Technical Field

The invention relates to a system and method of selecting a fuel injection limiting map for an internal combustion engine powered vehicle.

2. Description of the Problem

Electronically controlled fuel injection systems for internal combustion engines meter the amount of fuel supplied by the injectors to the cylinders. An electronic control unit, typically called the engine controller or engine/electronic control module (ECM) times and determines the quantity of fuel injected. The ECM is an on board computer which monitors engine operating variables through a plurality of sensors associated with the engine and controls the engine in response to sensor readings and to throttle position. The ECM determines the fuel quantities (either directly or indirectly) through reference to a Fuel Injection Limiting Map stored in memory. The Fuel Injection Limiting Map is a multi-dimensional lookup table, which is interrogated using selected engine operating variables as input arguments, e.g. engine temperature, engine load, etc., depending upon the operational objective. Fuel injection limiting maps may be designed to limit the maximum torque or power output an engine is allowed to achieve to meet an operator's objectives such as: maximizing service intervals; extending service life; or improving fuel economy. A regimen based on fuel injection limit maps may be implemented over a fleet of vehicles.

Another aspect of contemporary control over vehicle fleets involves centralization of control. The advent of geographical position systems (GPS) and near real time update of geographical information systems (GIS) or their tactical equivalents in military usage (under the broader guise of battlefield or theater logistics management) and reliable, secure communications links between a management center makes real time management of vehicles directed to instant objectives a possibility.

SUMMARY OF THE INVENTION

According to the invention there is provided a control system for a motor vehicle including remote, centralized elements and local elements. The control system includes data processing means remote to the vehicle as a remote central controller. The vehicle includes an internal combustion engine, an engine controller utilizing fuel maps for the control of a fuel injection system and a global positioning system unit for determining position. A wireless two way communication system couples the vehicle and the remote central controller to one another for the exchange of data. The vehicle reports position over the two way communication system to the remote central controller. The remote central controller stores or has access to geographic information for comparison to the vehicle location and for providing to the engine controller over the two way communications system a specific fuel injection limit map selection depending upon the geographic information.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
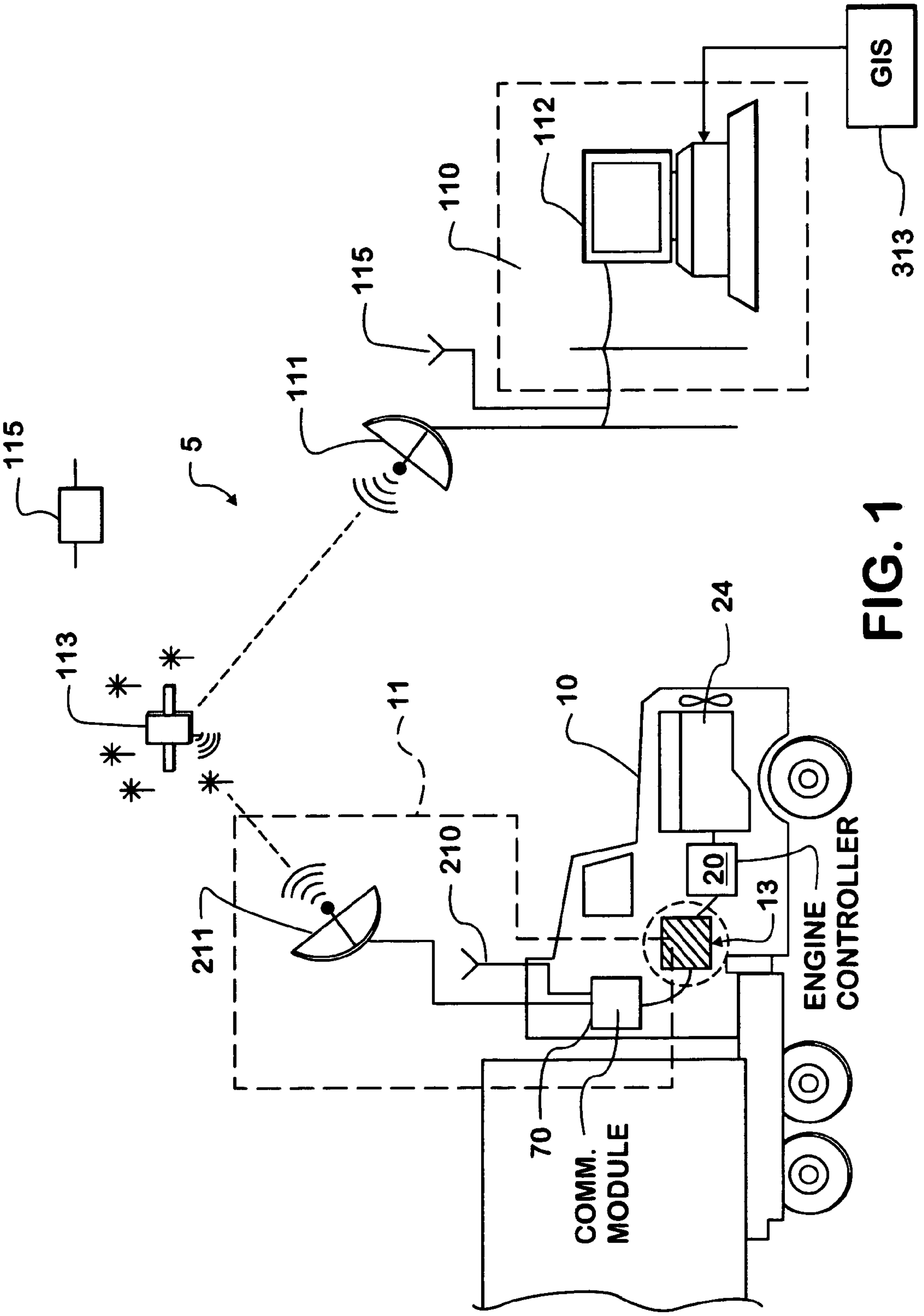
FIG. 1 is a schematic illustration of a theater vehicle control system.

Referring now to the figures and in particular to FIG. 1, a theater control system for trucks such as truck 10 is illustrated. Truck 10 is equipped with an internal combustion engine 24, typically a diesel, a two-way remote communications station 11 and an internal control network 13. Engine 24 is under the direct control of an engine controller 20 which determines, in response to several inputs, the output of engine 24. Communications station 11 implements the vehicle side of two way communications 5 between the vehicle 10 and a remote station 110. Utilizing a satellite link 113 and communication dishes 111 and 211 or over conventional radio links over antennas 210 and 115. Communications station 11 is managed by a communication controller 70. Remote station central controller 110 may include a tactical management workstation 112 on which is maintained a geographical information system (GIS 313) or similar data base updated periodically to reflect conditions likely to be encountered by the driver of vehicle 10 including, without limitation, weather conditions, road repair situations, or a military tactical situation. Vehicle 10 utilizes a GPS system represented by a GPS satellite 115 having a onboard GPS Unit 82 (See FIG. 2). Instructions generated by remote station 110 are linked once received by communication unit 11 to various controllers on board vehicle 10 over an internal data network 13. As described below, these may include changes to, or authorization to access alternative, fuel injection limiting maps stored on engine controller 20.

Figure 2:
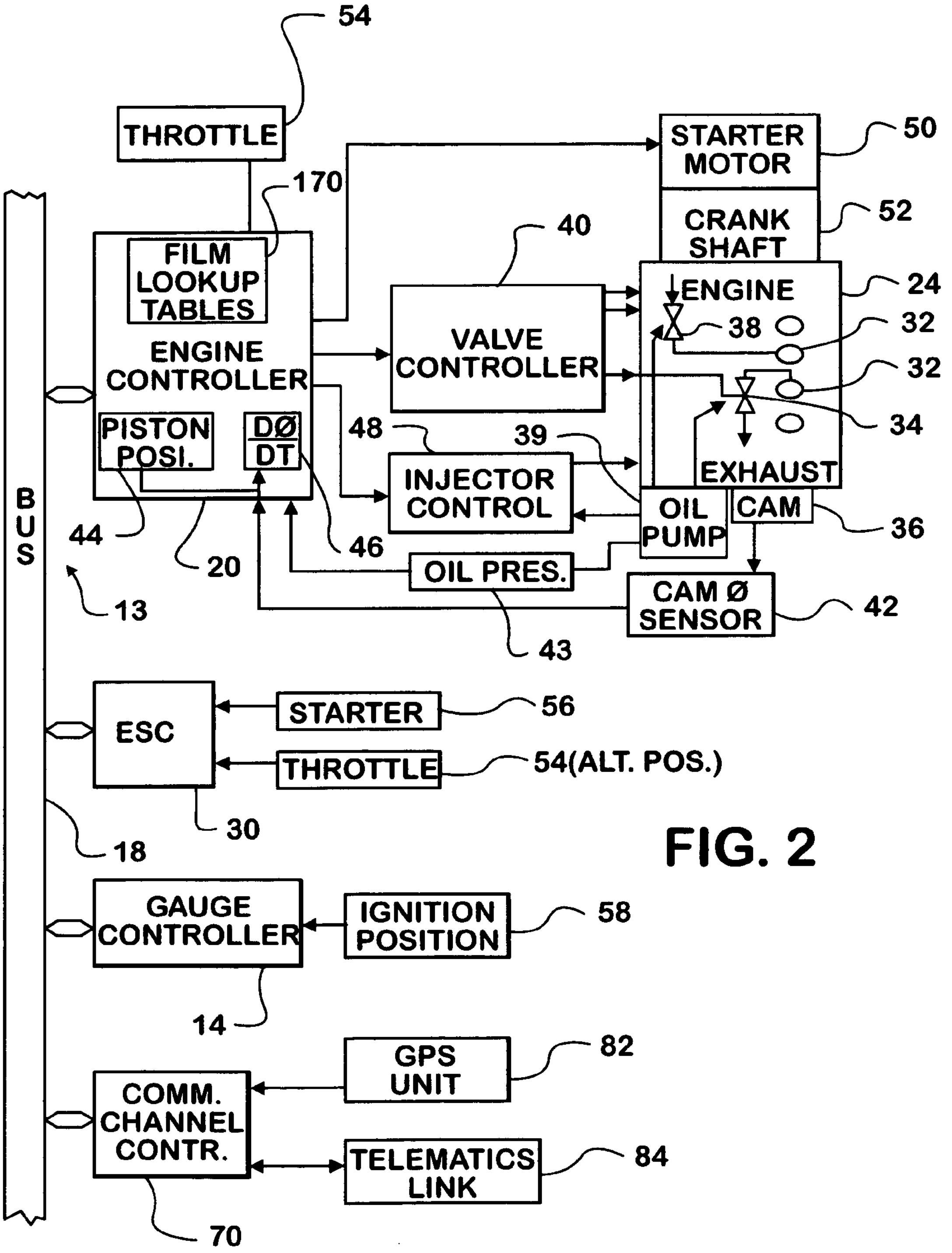
FIG. 2 is a block diagram of an internal vehicle control network.

FIG. 2 illustrates engine control in the environment of a controller area network 13 implemented over a serial data bus 18. In the preferred embodiment engine 24 is a diesel. Among controllers coupled for communication with one another over serial data bus 18 are engine controller 20, an electrical system controller (ESC) 30, a gauge controller 14 and communication controller 80. Implementation of a fuel injection limiting map for control over an engine 24 requires collection of various data from the engine. An ignition position sensor 58 is shown connected to gauge controller 14 and a starter 56 is connected to ESC 30. The figure by no means constitutes a complete description of the controllers typically present on a vehicle and provides only a suggestion of some of the tasks assigned controllers such as ESC 30 and gauge controller 14 perform. The data collected by the engine controller 20 is generally collected for operation of the engine and may be processed by conventional data processing facilities to generate values for variables not easily measured directly.

The data collected include throttle position, which is provided from throttle 54, which may be directly connected to engine controller 20, or which may be connected to ESC 30. Engine speed is determined by engine controller 20 from a cam 36 phase position sensor 42. An engine speed module 46 determines engine speed by taking the time derivative of cam phase position. A position module 44 determines the position of each piston from cam position.

Figure 3:
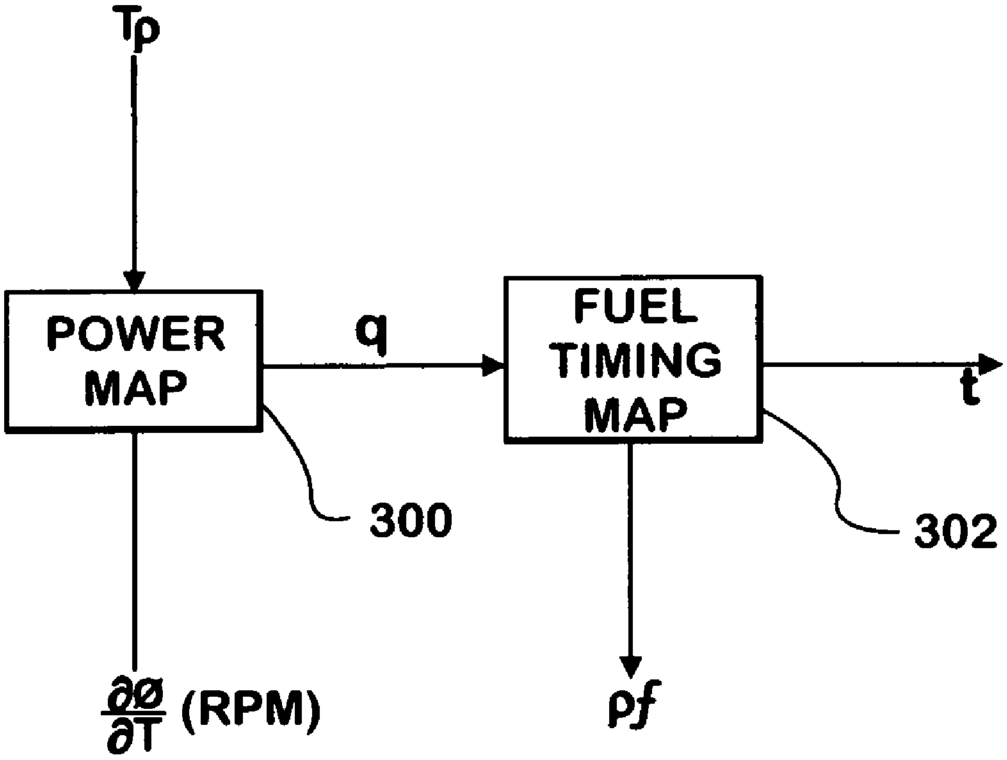
FIG. 3 is a block diagram of a control strategy for determination of a fuel limit for fuel injectors for a vehicle.

In the preferred embodiment, fuel injection is hydraulically controlled. Engine controller 20 provides output signals for controlling various auxiliary components associated with engine 24 including a starter motor 50 for cranking an engine crank shaft 52, a valve controller 40 which uses pressurized oil to open and close air intake valves 38 and exhaust valves 34 for each of a plurality of cylinders 32 and an injector controller 48 which also uses engine oil for controlling fuel injectors for each of the cylinders. Engine 24 has a cam 36 and an oil pump 39. A cam phase position sensor 42 reports cam phase position to the engine controller 20. A number of fuel injection limiting maps are stored as lookup tables 170 in engine controller memory. Under normal operating condition engine controller uses throttle position T from throttle 54 and engine speed (RPM) as arguments to interrogate a fuel injection limiting map 300 for power output to lookup a fuel quantity q which in turn is applied as an argument (along with oil pressure from oil sump pressure sensor 43) into a fuel timing map 302 which generates the fuel injection timing signals t. (See FIG. 3) These signals vary in duration depending upon instantaneous oil pressure, which effects the rate at which fuel can be ejected from the injectors.

A communications channel controller 70 is also connected to bus 13 for collecting bus 13 communications. Selected data gleaned from data traffic on bus 13 is reported to a remote station 110 over what is termed a telematics link 84, e.g., a wireless data link. Communications channel controller 70 also handles position reports from a GPS unit 82, which are provided to the operator over bus 13 and which are also uplinked to the remote station 110.

Remote station 110 compares position reports from a particular vehicle to the updated GIS 313, a tactical map or equivalent database. Depending upon the situation likely to confront the operator based on this comparison, remote station 110 may provide signals back over the telematics link 84 changing the fuel injection limiting maps 300 and fuel timing maps 302 which an engine controller 20 is permitted to use. For example, if a military vehicle is indicated as located in a hostile theater, the permitted power output of engine 24 can be increased.

The invention provides a way of managing vehicle operation without requiring driver intervention. Specifically, temporarily boosting permitted engine output during adverse conditions is possible by selection of a fuel injection limiting maps allowing greater fuel flow q.

While the invention is shown in only one of its forms, it is not thus limited but is susceptible to various changes and modifications without departing from the spirit and scope of the invention.

What is claimed is:

1. Apparatus comprising:

a vehicle;

data processing means remote to the vehicle;

a two way communications system linking the data processing means and the vehicle;

the vehicle having an internal combustion engine, a fuel injection system for the internal combustion engine and an engine controller for controlling the fuel injection system, the engine controller including memory for storing fuel injection limiting maps in the form of lookup tables and the engine controller coupled to the two way communications system;

a global positioning system location unit installed on the vehicle for determining vehicle location with the global positioning system coupled to the two way communications system for providing the remote station with the vehicle location; and the remote station storing or having access to geographic information for comparing the vehicle location and providing to the engine controller over the two way communications system a specific fuel injection limiting map selection.

2. A method of varying operation of a motor vehicle comprising the steps of:

maintaining geographic information on a remote station;

monitoring geographic position of the motor vehicle using a global positioning system location unit installed on the vehicle;

providing a plurality of fuel injection limiting maps stored on a memory unit installed on the vehicle;

maintaining two way communication between the motor vehicle and the remote station and periodically reporting the position of the vehicle to the remote station;

comparing the reported position of the motor vehicle to the geographic information and selecting a fuel injection limiting map for the motor vehicle responsive to the result of the comparison; and communicating the selected fuel injection limit map to the motor vehicle.

3. A control system for a motor vehicle, comprising:

a data network installed on the motor vehicle;

a plurality of controllers coupled to the data network for communication of data between the plurality of controllers, the plurality of controllers including an engine controller;

a global positioning system position determination unit installed on the motor vehicle;

a remote station on which is installed a geographic information database; and a wireless two way communication system coupling the data network and the remote station for providing vehicle position information to the remote station, the remote station including means responsive to the vehicle location information system and the geographic information for selecting a fuel injection limiting map and communicating the selection to the engine controller.

* * * * *